(12) United States Patent
Sullivan et al.

(10) Patent No.: US 10,621,022 B2
(45) Date of Patent: Apr. 14, 2020

(54) SYSTEM AND METHODS FOR HARDWARE-SOFTWARE COOPERATIVE PIPELINE ERROR DETECTION

(71) Applicant: NVIDIA Corp., Santa Clara, CA (US)

(72) Inventors: Michael Sullivan, San Jose, CA (US);
Siva Hari, Santa Clara, CA (US);
Brian Zimmer, Berkley, CA (US);
Timothy Tsai, Santa Clara, CA (US);
Stephen W Keckler, Austin, TX (US)

(73) Assignee: NVIDIA Corp., Santa Clara, CA (US)

( * ) Notice: Subject to any disclaimer, the term of this patent is extended or adjusted under 35 U.S.C. 154(b) by 186 days.

(21) Appl. No.: 15/845,314

(22) Filed: Dec. 18, 2017

(65) Prior Publication Data

US 2019/0102242 A1    Apr. 4, 2019

Related U.S. Application Data

(60) Provisional application No. 62/567,422, filed on Oct. 3, 2017.

(51) Int. Cl.
| | | |
|---|---|---|
| *G06F 11/07* | (2006.01) | |
| *G06F 11/10* | (2006.01) | |
| *G06F 9/30* | (2018.01) | |
| *G06F 9/38* | (2018.01) | |
| *G06F 11/22* | (2006.01) | |
| *G06F 11/16* | (2006.01) | |
| *G06F 11/14* | (2006.01) | |

(52) U.S. Cl.
CPC ........ *G06F 11/0727* (2013.01); *G06F 9/3004* (2013.01); *G06F 9/30018* (2013.01); *G06F 9/30098* (2013.01); *G06F 9/3832* (2013.01); *G06F 9/3857* (2013.01); *G06F 11/0793* (2013.01); *G06F 11/104* (2013.01); *G06F 11/1048* (2013.01); *G06F 11/1497* (2013.01); *G06F 11/1641* (2013.01); *G06F 11/2236* (2013.01)

(58) Field of Classification Search
CPC ............. G06F 11/1497; G06F 11/2236; G06F 11/1641; G06F 11/0721
See application file for complete search history.

(56) References Cited

U.S. PATENT DOCUMENTS

| | | |
|---|---|---|
| 7,058,877 B2 | 6/2006 | Tremblay |
| 7,620,875 B1 | 11/2009 | Nelson |
| 7,721,075 B2 | 5/2010 | Thekkath |
| 8,095,825 B2 | 1/2012 | Hirotsu |
| 8,301,992 B2 | 10/2012 | Bybell |
| 9,529,653 B2 | 12/2016 | Bose |

(Continued)

OTHER PUBLICATIONS

N. Oh, P. Shirvani, and E. McCluskey, "Error detection by duplicated instructions in super-scalar processors," IEEE Transactions on Reliability, vol. 51, No. 1, pp. 63-75, 2002.

(Continued)

*Primary Examiner* — Jigar P Patel
(74) *Attorney, Agent, or Firm* — Rowan TELS LLC

(57) ABSTRACT

A family of software-hardware cooperative mechanisms to accelerate intra-thread duplication leverage the register file error detection hardware to implicitly check the data from duplicate instructions, avoiding the overheads of instruction checking and enforcing low-latency error detection with strict error containment guarantees.

20 Claims, 11 Drawing Sheets

(56) References Cited

U.S. PATENT DOCUMENTS

| | | | |
|---|---|---|---|
| 2003/0217325 A1 | 11/2003 | Tremblay | |
| 2005/0138478 A1* | 6/2005 | Safford | G06F 9/3861 714/38.1 |
| 2006/0156123 A1* | 7/2006 | Mukherjee | G06F 11/1497 714/727 |
| 2011/0035643 A1 | 2/2011 | Bybell | |
| 2011/0296228 A1* | 12/2011 | Elnozahy | G06F 11/1479 714/2 |
| 2013/0283122 A1 | 10/2013 | Anholt | |
| 2015/0277915 A1 | 10/2015 | Kelm | |
| 2015/0377961 A1* | 12/2015 | Lin | G06F 11/263 714/724 |

OTHER PUBLICATIONS

G. A. Reis, J. Chang, N. Vachharajani, R. Rangan, and D. I. Aug., "SWIFT: Software implemented fault tolerance," in Proceedings of the International Symposium on Code Generation and Optimization (CGO), pp. 243-254, 2005.

M. Dimitrov, M. Mantor, and H. Zhou, "Understanding software approaches for GPGPU reliability," in Proceedings of Workshop on General Purpose Processing on Graphics Processing Units, pp. 94-104, 2009.

Avizienis, "Arithmetic error codes: Cost and effectiveness studies for application in digital system design," IEEE Transactions on Computers, vol. C-20, pp. 1322-1331, 1971.

C. Wang, H. Kim, Y. Wu, and V. Ying, "Compiler-managed software-based redundant multi-threading for transient fault detection," in Preceedings of the International Symposium on Code Generation and Optimization (CGO), 2007.

J. Wadden, A. Lyashevsky, S. Gurumurthi, V. Sridharan, and K. Skadron, "Real-world design and evaluation of compiler-managed GPU redundant multithreading," in Proceedings of the International Symposium on Computer Architecture (ISCA), 2014.

* cited by examiner

SYSTEM AND METHODS FOR HARDWARE-SOFTWARE COOPERATIVE PIPELINE ERROR DETECTION

This application claims priority and benefit under 35 U.S.C 119(e) to U.S. provisional application No. 62/567,422, filed on Oct. 3, 2017, the contents of which are incorporated herein in their entirety.

BACKGROUND

Compute-class processors typically provide error detection or correction for register file storage using ECC codes, leaving coverage holes for transient errors that occur in pipeline structures such as datapath registers and arithmetic logic. Register file storage ECC cannot check for pipeline errors because encoding takes place after these errors strike, meaning that valid-yet-incorrect codewords are written back to the register. Any thorough protection scheme must avoid such coverage holes, and systems that demand high levels of reliability, availability, or that operate in harsh conditions must rely on a separate mechanism to protect against these pipeline errors at great expense, typically through some form of spatial or temporal duplication.

A drawback of spatial duplication tends to be its high chip area cost or design complexity. Spatial duplication roughly doubles the amount of hardware needed for the execution pipeline, which is likely to be prohibitively costly in compute-intensive processors such as GPUs. A more area-efficient alternative to full-duplication-based error detection is to employ specialized concurrent checkers to vet operations as they execute. Such techniques have the opportunity to provide low-latency error detection with relatively little hardware, but they either suffer from limited scope (protecting only a simplified RISC pipeline) or require the significant design complexity and area and power costs of protecting each pipeline operation individually. Temporal duplication is general, user-transparent, and requires no new hardware, but it can incur high performance overheads. For example, one form of temporal duplication is to perform each instruction twice, eventually checking for agreement between the data produced by the original and shadow instructions. This approach uses explicit checking instructions (leading to program bloat), roughly doubles program register usage, and doubles the number of arithmetic operations, potentially leading to a slowdown of 2× or more.

BRIEF SUMMARY

Embodiments of a family of software-hardware cooperative mechanisms to accelerate intra-thread duplication are described herein. These mechanisms leverage the register file error detection hardware to implicitly check the data from duplicate instructions, avoiding the overheads of instruction checking and enforcing low-latency error detection with strict error containment guarantees. Various implementations are described that successively reduce the sources of inefficiency in intra-thread duplication with different complexities and error correction tradeoffs. These mechanisms may be applied to protect a GPU-based processor (or other processor, more generally) against pipeline errors with modest hardware modifications and with modest (e.g., 15%) average execution impact.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
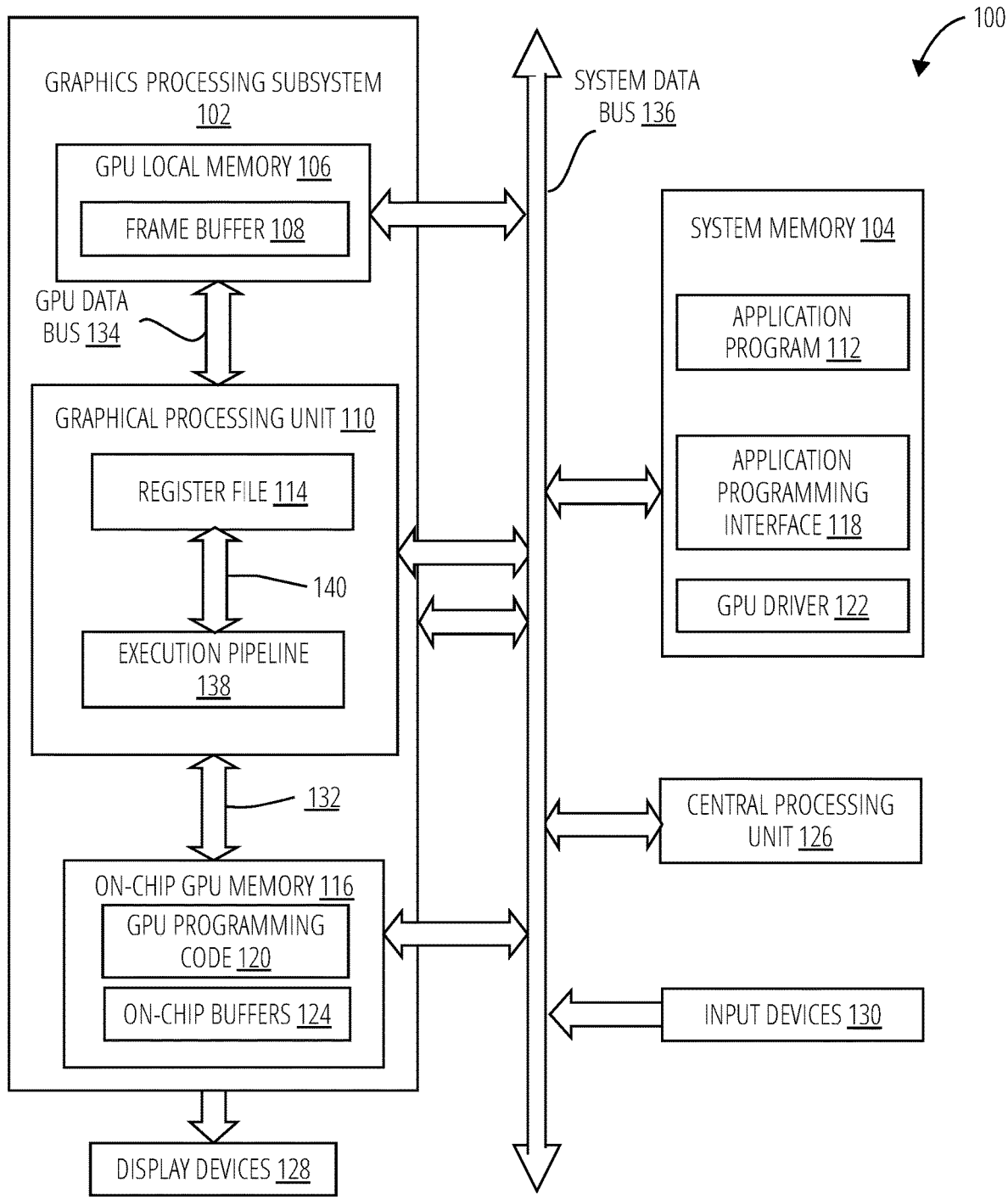
FIG. 1 is a block diagram of a computing system 100 within which the GPU or method introduced herein may be embodied or carried out.

Herein, the following acronyms are utilized:
"ECC" refers to "error correcting codes";
"EDC" refers to "error detecting codes";
"GPU" refers to "graphics processing unit";
"DUE" refers to "detected yet uncorrected error";
"SDC" refers to "silent data corruption";
"SEC" refers to "single bit error correcting";
"DED" refers to "double bit error detecting";
"TED" refers to "triple bit error detecting"; and
"DCE" refers to "detected and corrected error".

A system and methods are disclosed to enable register file error detection logic to implicitly check for pipeline errors in addition to storage errors. This may be done by swapping the error check-bits from original and duplicate instruction such that valid-yet-incorrect codewords that are produced by a pipeline error are split and swapped to allow proper detection and diagnosis. By checking for errors with the register detection hardware, the temporal duplication overheads of explicit instruction checking are avoided while maintaining low-latency pipeline error detection with strict error containment guarantees. Although disclosed in a preferred mode for use with a GPU processor, the disclosed systems and processes are more general, and may be applied as well to other computing processor platforms with ECC-protected register files.

Specialized check-bit predictors may be employed to optimize error detection, avoiding the need to duplicate the most common operations. Residue codes may be preferred for this purpose because they provide strong coverage against arithmetic errors and have an efficient predictor logic implementation. Alternatively, specialized check-bit generators may be employed for storage ECC codes. For instance, parity prediction circuitry or SEC-TED/TED prediction units exist for addition and multiplication. Such storage check-bit prediction may provide a less intrusive design changes for systems already using these codes. Thus in an alternate embodiment, check-bit prediction with addition/subtraction TED prediction may be utilized with a modest performance penalty (e.g., just 15% average slowdown) and sacrificing little or no error coverage relative to a residue code.

Three different embodiments of error detection and correction logic are described. The logic is designed such that it may be utilized together, if desired, so that dynamically mixing the different features of each implementation may be readily accomplished.

High reliability systems differ in their efficiency needs, the amount of chip area and design effort they can devote to pipeline error protection, and the rate of detectable-yet-uncorrectable (DUE) errors that they can tolerate. The disclosed detection/correction schemes progressively target the performance overhead of temporal duplication with differing design complexities and DUE rate trade-offs.

The disclosed systems and processes may be utilized with any register file error detecting code. However, due to the severity of arithmetic errors, stronger than double-bit error detection (DED) is preferred, especially error-detecting residue codes. Innovations are disclosed herein to effectively apply these types of codes for ECC check-bit prediction in a modern GPU-based processor.

Operating Environment for the Disclosed Schemes

FIG. 1 is a block diagram of one embodiment of a computing system 100 in which one or more aspects of the error detection and correction schemes may be implemented. The computing system 100 includes a system data bus 136, a CPU 126, input devices 130, a system memory 104, a graphics processing subsystem 102, and display devices 128. In alternate embodiments, the CPU 126, portions of the graphics processing subsystem 102, the system data bus 136, or any combination thereof, may be integrated into a single processing unit. Further, the functionality of the graphics processing subsystem 102 may be included in a chipset or in some other type of special purpose processing unit or co-processor.

As shown, the system data bus 136 connects the CPU 126, the input devices 130, the system memory 104, and the graphics processing subsystem 102. In alternate embodiments, the system memory 104 may connect directly to the CPU 126. The CPU 126 receives user input from the input devices 130, executes programming instructions stored in the system memory 104, operates on data stored in the system memory 104, and configures the graphics processing subsystem 102 to perform specific tasks in the graphics pipeline. The system memory 104 typically includes dynamic random access memory (DRAM) employed to store programming instructions and data for processing by the CPU 126 and the graphics processing subsystem 102. The graphics processing subsystem 102 receives instructions transmitted by the CPU 126 and processes the instructions to render and display graphics images on the display devices 128.

As also shown, the system memory 104 includes an application program 112, an API 118 (application programming interface), and a graphics processing unit driver 122 (GPU driver). The application program 112 generates calls to the API 118 to produce a desired set of results, typically in the form of a sequence of graphics images. The application program 112 also transmits zero or more high-level shading programs to the API 118 for processing within the graphics processing unit driver 122. The high-level shading programs are typically source code text of high-level programming instructions that are designed to operate on one or more shading engines within the graphics processing subsystem 102. The API 118 functionality is typically implemented within the graphics processing unit driver 122. The graphics processing unit driver 122 is configured to translate the high-level shading programs into machine code shading programs that are typically optimized for a specific type of shading engine (e.g., vertex, geometry, or fragment).

The graphics processing subsystem 102 includes a GPU 110 (graphics processing unit), an on-chip GPU memory 116, an on-chip GPU data bus 132, a GPU local memory 106, and a GPU data bus 134. The GPU 110 is configured to communicate with the on-chip GPU memory 116 via the on-chip GPU data bus 132 and with the GPU local memory 106 via the GPU data bus 134. The GPU 110 may receive instructions transmitted by the CPU 126, process the instructions to render graphics data and images, and store these images in the GPU local memory 106. Subsequently, the GPU 110 may display certain graphics images stored in the GPU local memory 106 on the display devices 128.

The GPU 110 includes one or more register file 114 and execution pipeline 138 that interact via an on-chip bus 140. The various error detecting and correcting schemes disclosed herein detect and in some cases correct for data corruption that takes place in the execution pipeline 138, during data exchange over the on-chip bus 140, and for data storage errors in the register file 114.

The GPU 110 may be provided with any amount of on-chip GPU memory 116 and GPU local memory 106, including none, and may employ on-chip GPU memory 116, GPU local memory 106, and system memory 104 in any combination for memory operations.

The on-chip GPU memory 116 is configured to include GPU programming 120 and on-Chip Buffers 124. The GPU programming 120 may be transmitted from the graphics processing unit driver 122 to the on-chip GPU memory 116 via the system data bus 136. The GPU programming 120 may include a machine code vertex shading program, a machine code geometry shading program, a machine code fragment shading program, or any number of variations of each. The on-Chip Buffers 124 are typically employed to store shading data that requires fast access to reduce the latency of the shading engines in the graphics pipeline. Because the on-chip GPU memory 116 takes up valuable die area, it is relatively expensive.

The GPU local memory 106 typically includes less expensive off-chip dynamic random access memory (DRAM) and is also employed to store data and programming employed by the GPU 110. As shown, the GPU local memory 106 includes a frame buffer 108. The frame buffer 108 stores data for at least one two-dimensional surface that may be employed to drive the display devices 128. Furthermore, the frame buffer 108 may include more than one two-dimensional surface so that the GPU 110 can render to one two-dimensional surface while a second two-dimensional surface is employed to drive the display devices 128.

The display devices 128 are one or more output devices capable of emitting a visual image corresponding to an input data signal. For example, a display device may be built using a cathode ray tube (CRT) monitor, a liquid crystal display, or any other suitable display system. The input data signals to the display devices 128 are typically generated by scanning out the contents of one or more frames of image data that is stored in the frame buffer 108.

Figure 2:
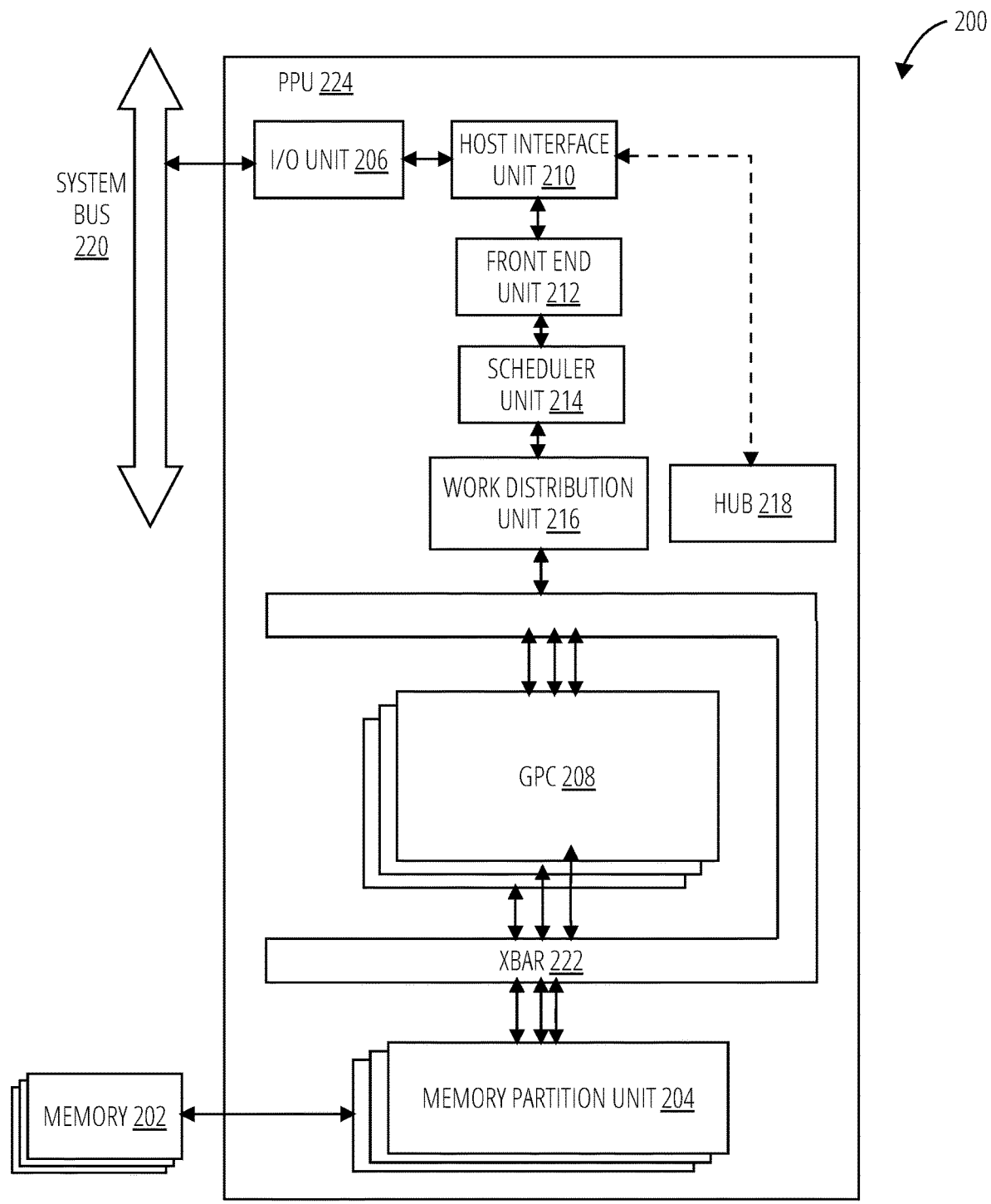
FIG. 2 illustrates a parallel processing architecture 200 in accordance with one embodiment.

FIG. 2 illustrates a parallel processing architecture 200 in accordance with one embodiment, in which the various error detection and correction schemes disclosed herein may be utilized. In one embodiment, the parallel processing architecture 200 includes a parallel processing unit (PPU 224) that is a multi-threaded processor implemented on one or more integrated circuit devices. The parallel processing architecture 200 is a latency hiding architecture designed to process a large number of threads in parallel. A thread (i.e., a thread of execution) is an instantiation of a set of instructions configured to be executed by the parallel processing architecture 200. In one embodiment, the PPU 224 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing architecture 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 224 includes an I/O unit 206 (input/output unit), a host interface unit 210, a front end unit 212, a scheduler unit 214, a work distribution unit 216, a hub 218, an xbar 222 (crossbar), one or more GPC 208 (general processing cluster), and one or more memory partition unit 204. The PPU 224 may be connected to a host processor or other peripheral devices via a system bus 220. The PPU 224 may also be connected to a local memory comprising a number of memory devices 202. In one embodiment, the local memory may comprise a number of dynamic random access memory (DRAM) devices.

The I/O unit 206 is configured to transmit and receive communications (i.e., commands, data, etc.) from a host processor (not shown) over the system bus 220. The I/O unit 206 may communicate with the host processor directly via the system bus 220 or through one or more intermediate devices such as a memory bridge. In one embodiment, the I/O unit 206 implements a Peripheral Component Interconnect Express (PCIe) interface for communications over a PCIe bus. In alternative embodiments, the I/O unit 206 may implement other types of well-known interfaces for communicating with external devices.

The I/O unit 206 is coupled to a host interface unit 210 that decodes packets received via the system bus 220. In one embodiment, the packets represent commands configured to cause the PPU 224 to perform various operations. The host interface unit 210 transmits the decoded commands to various other units of the parallel processing architecture 200 as the commands may specify. For example, some commands may be transmitted to the front end unit 212. Other commands may be transmitted to the hub 218 or other units of the PPU 224 such as one or more copy engines, a video encoder, a video decoder, a power management unit, etc. (not explicitly shown). In other words, the host interface unit 210 is configured to route communications between and among the various logical units of the PPU 224.

In one embodiment, a program executed by the host processor encodes a command stream in a buffer that provides workloads to the PPU 224 for processing. A workload may comprise a number of instructions and data to be processed by those instructions. The buffer is a region in a memory that is accessible (i.e., read/write) by both the host processor and the PPU 224. For example, the host interface unit 210 may be configured to access the buffer in a system memory connected to the system bus 220 via memory requests transmitted over the system bus 220 by the I/O unit 206. In one embodiment, the host processor writes the command stream to the buffer and then transmits a pointer to the start of the command stream to the PPU 224. The host interface unit 210 provides the front end unit 212 with pointers to one or more command streams. The front end unit 212 manages the one or more streams, reading commands from the streams and forwarding commands to the various units of the PPU 224.

The front end unit 212 is coupled to a scheduler unit 214 that configures the GPC 208 to process tasks defined by the one or more streams. The scheduler unit 214 is configured to track state information related to the various tasks managed by the scheduler unit 214. The state may indicate which GPC 208 a task is assigned to, whether the task is active or inactive, a priority level associated with the task, and so forth. The scheduler unit 214 manages the execution of a plurality of tasks on the one or more GPC 208.

The scheduler unit 214 is coupled to a work distribution unit 216 that is configured to dispatch tasks for execution on the GPC 208. The work distribution unit 216 may track a number of scheduled tasks received from the scheduler unit 214. In one embodiment, the work distribution unit 216 manages a pending task pool and an active task pool for each GPC 208. The pending task pool may comprise a number of slots (e.g., 16 slots) that contain tasks assigned to be processed by a particular GPC 208. The active task pool may comprise a number of slots (e.g., 4 slots) for tasks that are actively being processed by each GPC 208. As a GPC 208 finishes the execution of a task, that task is evicted from the active task pool for the GPC 208 and one of the other tasks from the pending task pool is selected and scheduled for execution on the GPC 208. If an active task has been idle on the GPC 208, such as while waiting for a data dependency to be resolved, then the active task may be evicted from the GPC 208 and returned to the pending task pool while another task in the pending task pool is selected and scheduled for execution on the GPC 208.

The work distribution unit 216 communicates with the (one or more) GPC 208 via an xbar 222. The xbar 222 is an interconnect network that couples many of the units of the PPU 224 to other units of the PPU 224. For example, the xbar 222 may be configured to couple the work distribution unit 216 to a particular GPC 208. Although not shown explicitly, one or more other units of the PPU 224 are coupled to the host interface unit 210. The other units may also be connected to the xbar 222 via a hub 218.

The tasks are managed by the scheduler unit 214 and dispatched to a GPC 208 by the work distribution unit 216. The GPC 208 is configured to process the task and generate results. The results may be consumed by other tasks within the GPC 208, routed to a different GPC 208 via the xbar 222, or stored in the memory devices 202. The results can be written to the memory devices 202 via the memory partition unit 204, which implement a memory interface for reading and writing data to/from the memory devices 202. In one embodiment, the PPU 224 includes a number U of memory partition unit 204 that is equal to the number of separate and distinct memory devices 202 coupled to the PPU 224.

In one embodiment, a host processor executes a driver kernel that implements an application programming interface (API) that enables one or more applications executing on the host processor to schedule operations for execution on the PPU 224. An application may generate instructions (i.e., API calls) that cause the driver kernel to generate one or more tasks for execution by the PPU 224. The driver kernel outputs tasks to one or more streams being processed by the PPU 224. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3:
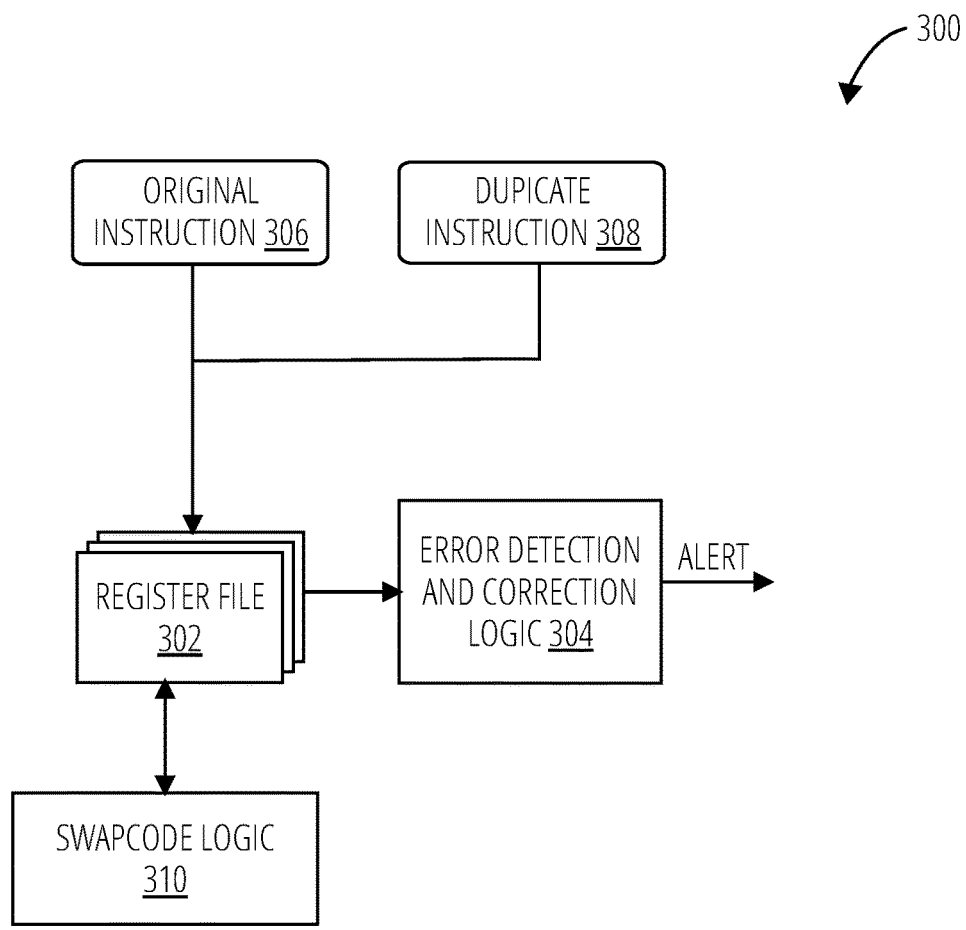
FIG. 3 illustrates a swap-code system 300 in accordance with one embodiment.
Figure 4:
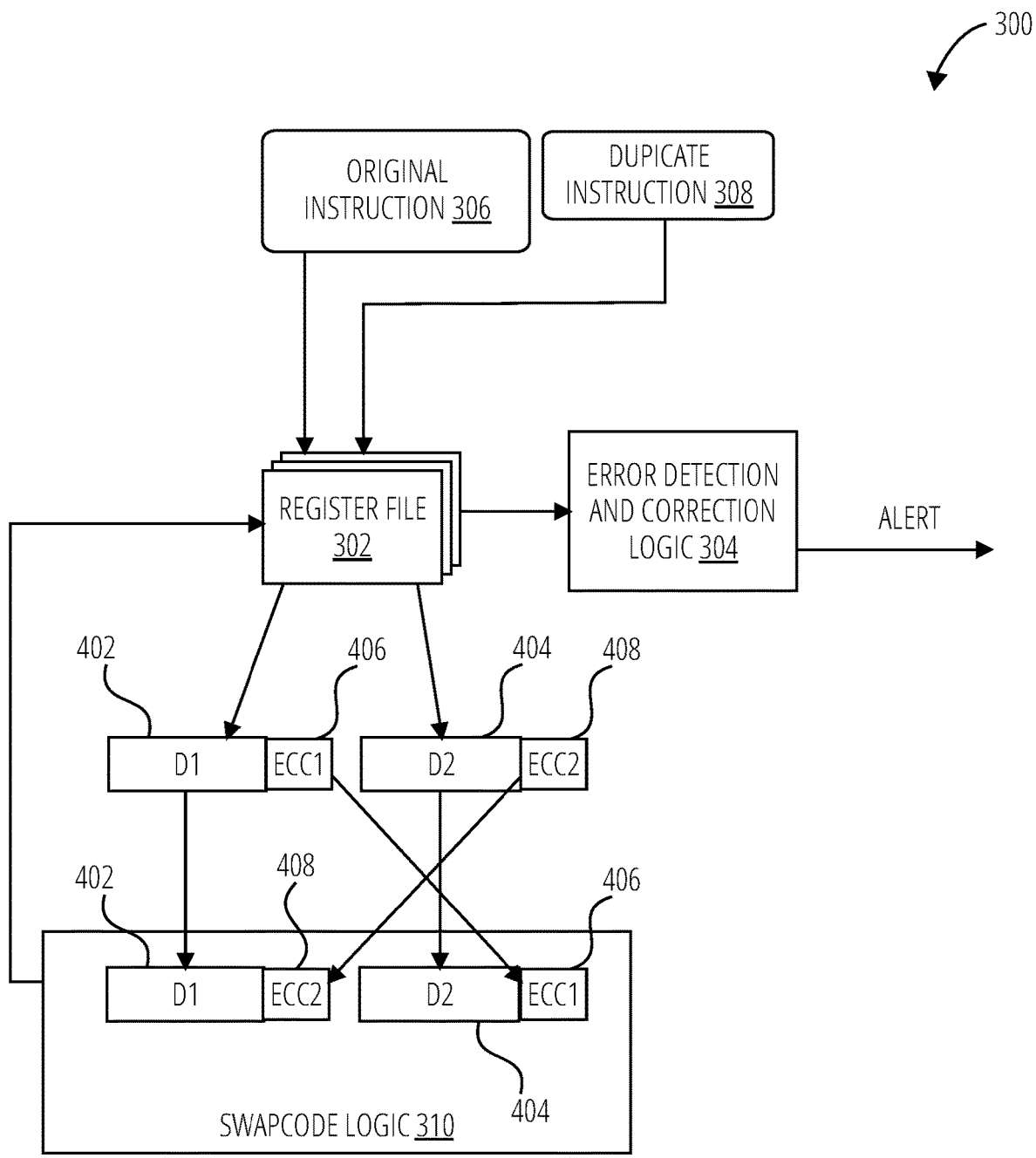
FIG. 4 further illustrates the swap-code system 300 in accordance with one embodiment.
Figure 5:
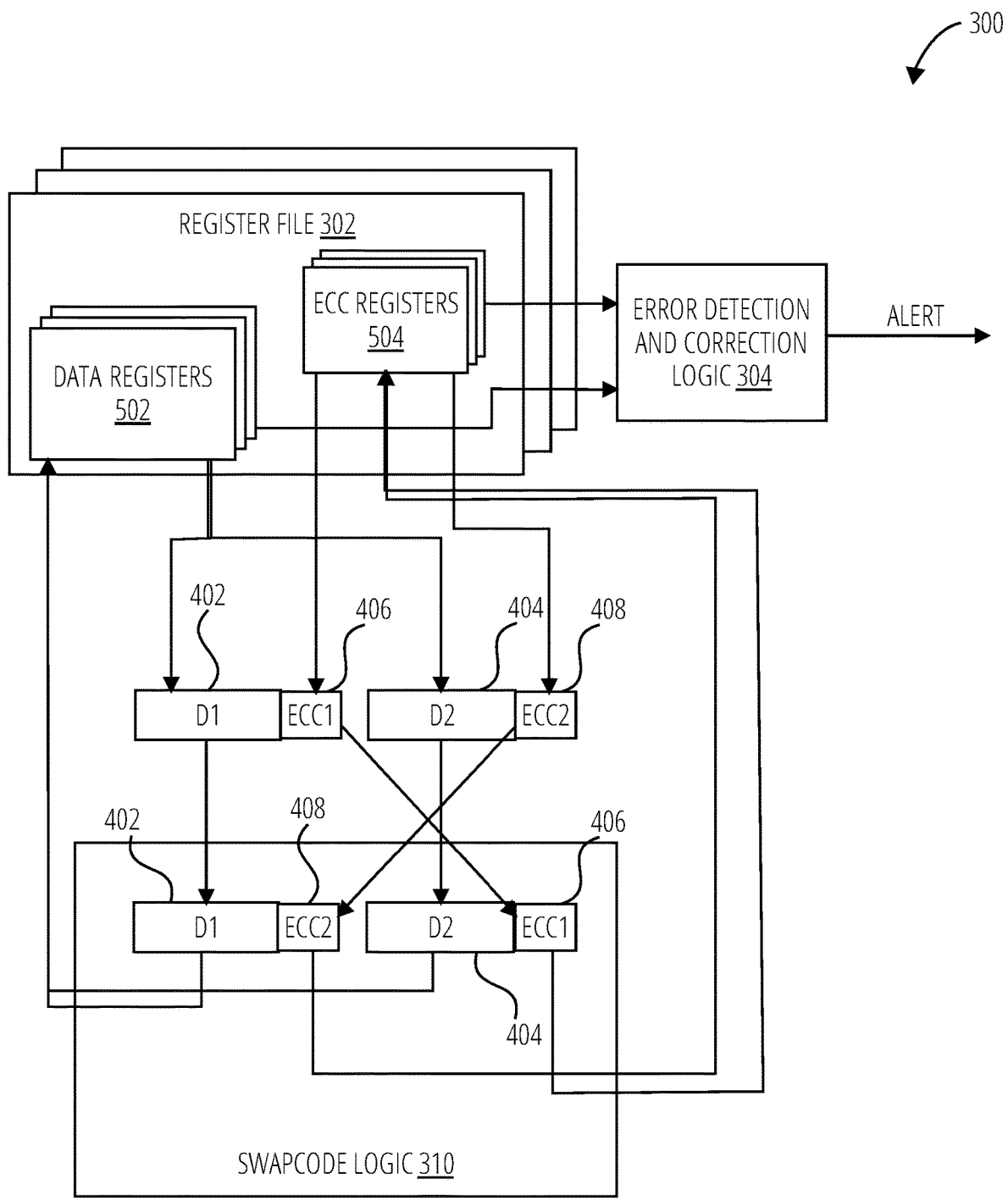
FIG. 5 further illustrates the swap-code system 300 in accordance with one embodiment.

Description of Preferred Implementations of Error Detection and Correction Logic Referring now to FIG. 3-FIG. 5, a swap-code system 300 in one embodiment comprises a register file 302 that receives writeback data from an original instruction 306 and a duplicate instruction 308. The register file 302 is coupled with error detection and correction logic 304 and with swapcode logic 310.

The swap-code system 300 ("SwapCorrect") corrects storage errors in the register file 302 and detects pipeline errors without explicit checking instructions, mitigating the need for error checking overhead. The swap-code system 300 utilizes a novel decoding scheme to differentiate storage errors from pipeline errors, maintaining common-case storage error correction without risk of mis-correcting a pipeline error.

The original instruction 306 writes a codeword comprising a data portion D1 402 and an error correcting code portion ECC1 406. The dupicate instruction 308 writes a codeword comprising a data portion D2 404 and an error correcting code portion ECC2 408. The swapcode logic 310 swaps ECC1 406 onto D2 404 and swaps ECC2 408 onto D1 402.

D1 402 and D2 404 are written back by the swapcode logic 310 to a separately addressable bank of data registers 502, and ECC1 406 and ECC2 408 are written back to a separately addressable (from the data registers 502) bank of ECC registers 504. The swapped association between D1 402 and ECC2 408, and between D2 404 and ECC1 406, is maintained.

The swap-code system 300 utilizes the error detection and correction logic 304 to detect errors (such as those that occur in the execution pipeline) while possibly using a modified decoding procedure to maintain correction against storage errors in the register file. The swap-code system 300 performs intra-thread instruction execution duplication, swapping the check-bits from the original and duplicate instruction data outputs to detect both storage and pipeline errors.

Once an error is detected, it is diagnosed (and possibly corrected if it occurs in the register file 302 itself) in one embodiment by triggering a higher-level exception (ALERT) in the runtime system. Upon writeback of the instruction data outputs to the register file 302, the register file 302 swaps the error detecting check-bits from the original and shadow codewords, storing the check-bits (ECC1 406) of the codeword output by the original instruction 306 in the shadow register, and vice versa. Swapping of the error detecting check-bits is not performed during register reads, and error detection on reads proceeds as normal using the swapped codewords.

During error-free operation, the original and shadowed registers for a duplicated instruction will have valid codewords. However, a pipeline error during execution of either the original or shadow instruction will cause the original and shadow data outputs and check-bits pairs to disagree, resulting in a detected error.

The swap-code system 300 is a software-hardware collaborative mechanism that leverages a modified compiler for the majority of its functionality. Instruction duplication and scheduling are performed by the compiler, and no hardware changes are required for the datapath or error detecting hardware. However, some ISA (instruction set architecture) changes are needed to differentiate the original and shadow instructions and separately address the data and check-bit destination registers. The swap-code system 300 also requires a register file 302 with separately addressable data registers 502 and ECC/EDC registers (e.g., ECC registers 504).

The swap-code system 300 may be utilized with an idempotence-aware compiler pass and applied only to registers where it is difficult or expensive to recover from errors through idempotent retry. The majority of instructions in such an implementation would utilize the swap-code system 300 or swap-detect system 700/swap-detect system 800, and idempotent retry for recovery. Such an implementation may provide register file error correction and pipeline error detection with less resource overhead than utilizing the swap-code system 300 or idempotent retry alone.

The swap-code system 300 further utilizes a modified error detector (e.g., in hardware) and correction logic 304 (e.g., software) to correct errors in the values that are stored in the register file 302. Error detection is performed upon each register read, using the swapped codeword applied to unmodified error detection hardware. The syntax "D1/E2" is used to denote the data from the first (or original) instruction writeback (e.g., D1 402), and the error-detecting/correcting check-bits from the second (shadow) instruction writeback (e.g., ECC2 408). Upon a detected read error in D1/E2, error detection is performed on the swapped shadow codeword (D2/E1) and un-swapped codewords (D1/E1 and D2/E2).

The swap-code system 300 may be implemented for example by adding an intra-thread duplication pass and associated scheduling logic to the back-end code compiler for the system, providing a kernel launch parameter to enable/disable the swap-code logic, adding error correction logic to the system runtime logic, implementing an 8 bit ECC destination address in the ISA, and providing a register file with a separately addressable ECC register file.

Figure 6:
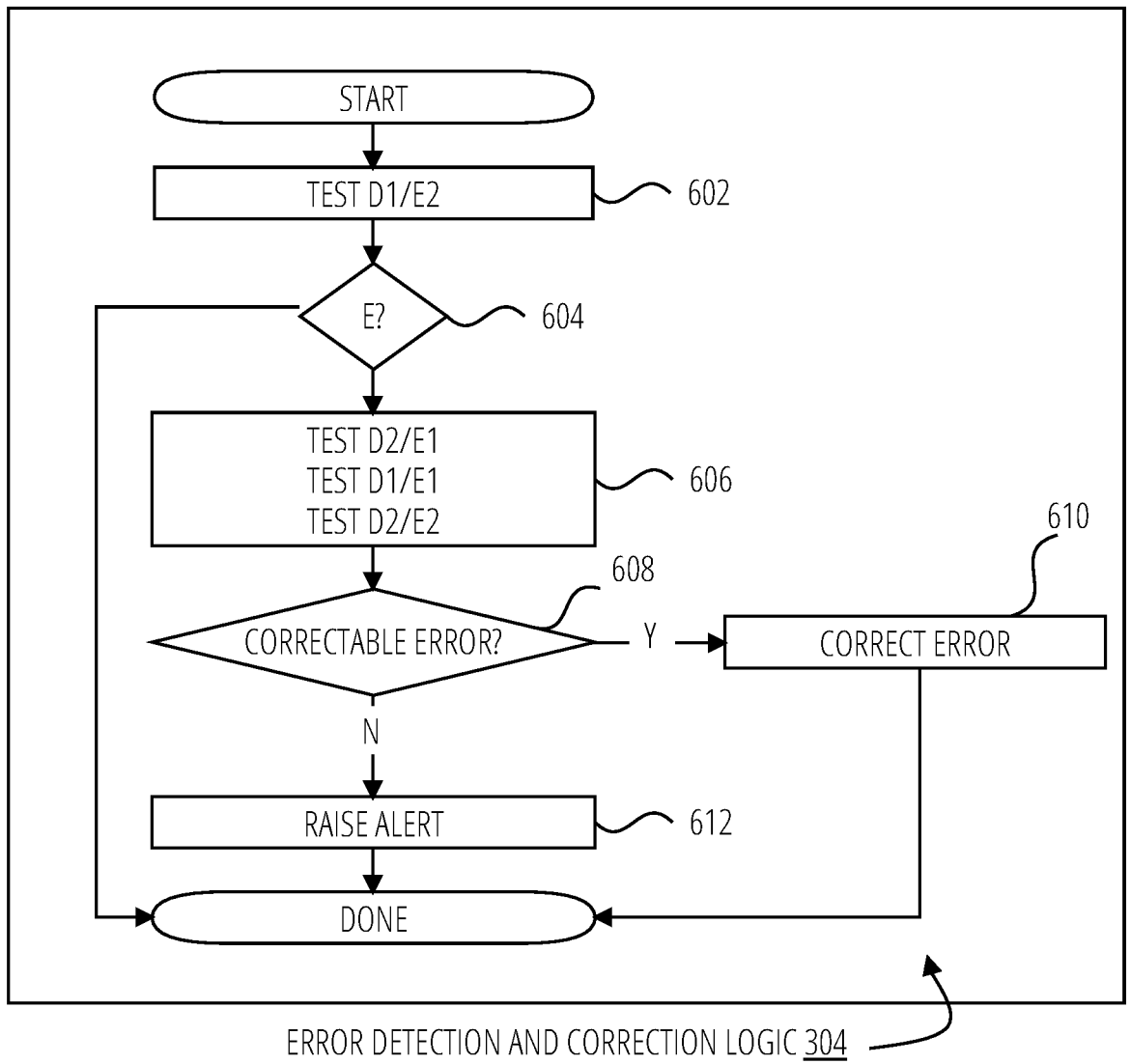
FIG. 6 illustrates error detection and correction logic 304 in accordance with one embodiment.

Referring now to FIG. 6, at block 602 the above-described test is performed on D1/D2. If an error is detected at decision block 604 the above-described additional three tests are performed at block 606, and if a correctable error is detected (decision block 608) the error is corrected at block 610, otherwise an alert is raised at block 612.

Based on the error detection results of block 606, storage and compute errors can be differentiated. A list of the possible scenarios is shown in Table 1. Only the three starred scenarios are expected to be common, but many more rare and severe errors remain detectable.

TABLE 1

| D1/E1 | D2/E2 | D2/E1 | Error Type | Likely Cause |
|---|---|---|---|---|
| 0 | 0 | 0 | DUE | Unknown/Invalid |
| 0 | 0 | 1 | DUE | Compute Error * |
| 0 | 1 | 0 | DCE (D1/E1) | Storage Error in E2 * |
| 0 | 1 | 1 | DCE (D1/E1) | Double Event in D2/E2 |
| 1 | 0 | 0 | DCE (D1/E2) | Storage Error in D1 * |
| 1 | 0 | 1 | DCE (D2/E2) | Double Event in D1/E1 |
| 1 | 1 | 0 | DUE | Multibit Error in D1/E2 |
| 1 | 1 | 1 | DUE | Multibit Error in D1/D2 or E1/E2 |

Figure 7:
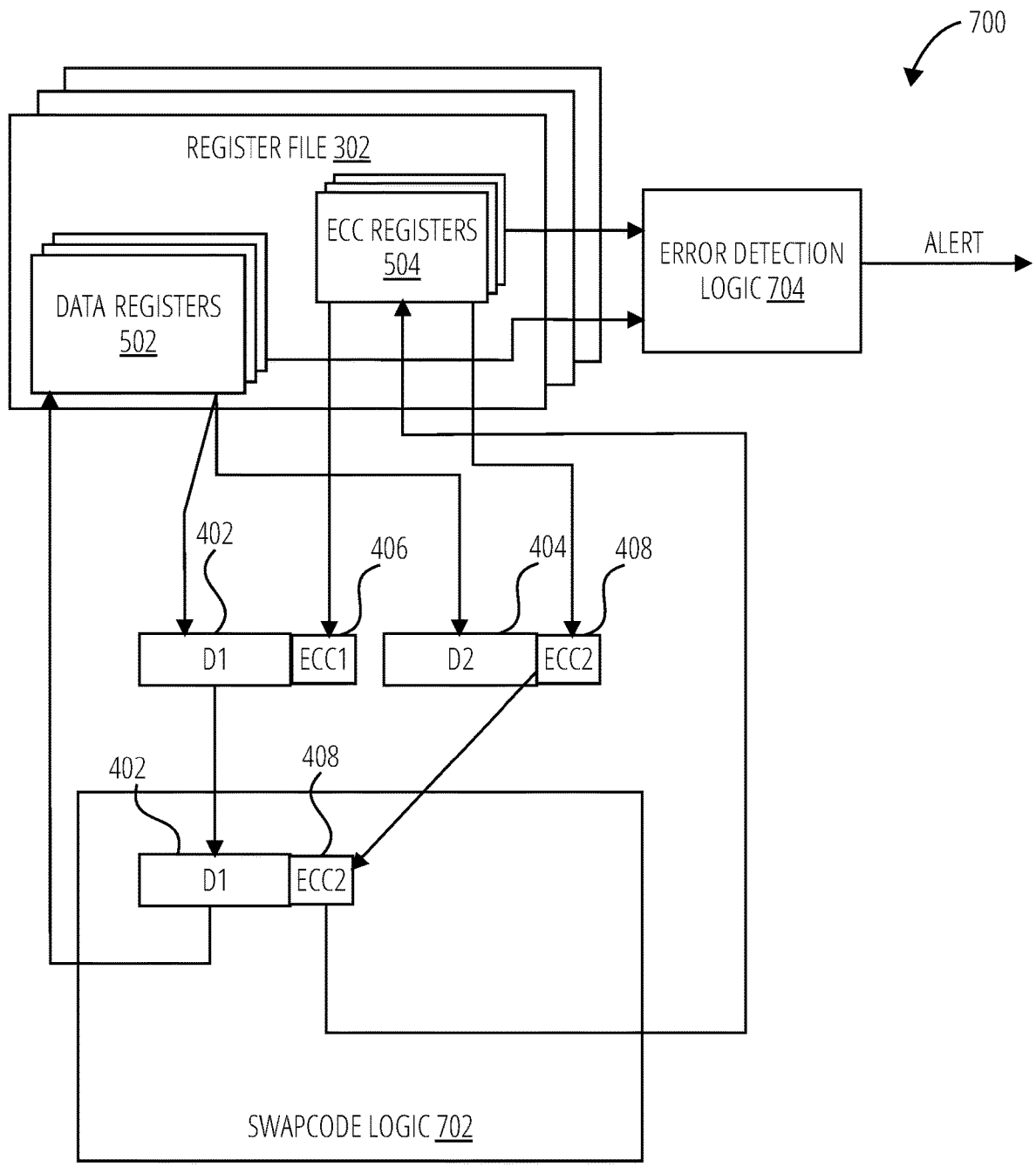
FIG. 7 illustrates a swap-detect system 700 in accordance with one embodiment.

Referring now to FIG. 7, a swap-detect system 700 ("SwapDetect") in accordance with one embodiment comprises many of the elements of the swap-code system 300, but requires fewer resource overheads. The swap-detect system 700 includes swap-code logic 702 and error detection logic 704. The swap-detect system 700 eliminates replicated values in the register file 302, increasing efficiency, but sacrifices the ability of swap-code system 300 to correct register file storage errors.

The swap-detect system 700 may be preferable in situations in which correction of errors in the register file 302 is unneeded. In this case, swapped codewords can be used without shadow storage to detect both register file storage and pipeline errors. The swap-detect system 700 requires more modest hardware changes than the swap-code system 300, but it can also operate with the swap-code system 300 logic such that a system can support both mechanisms. For example, the swap-code system 300 requires separately addressable data and check-bit storage (e.g., data registers 502 and ECC registers 504).

Figure 8:
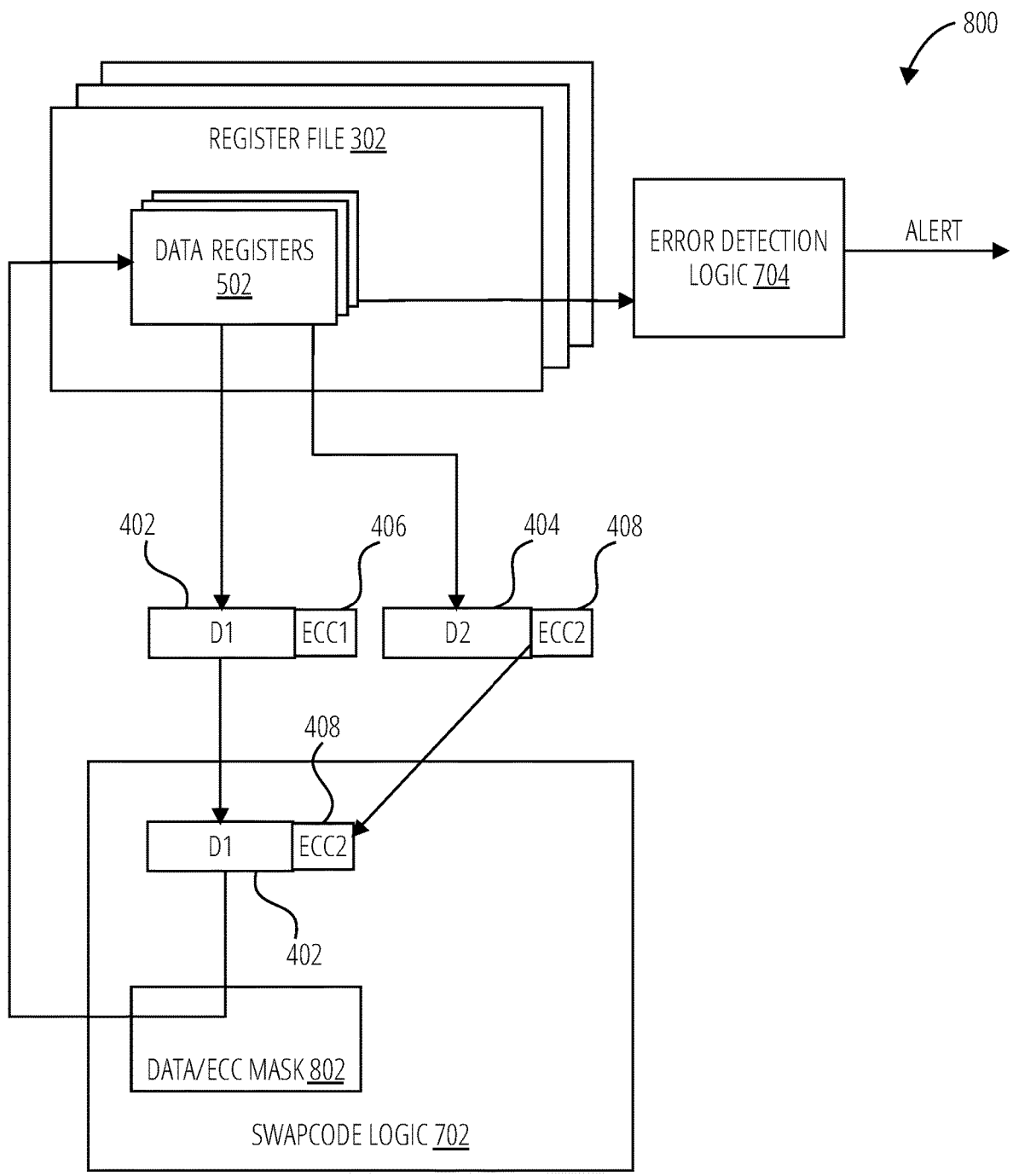
FIG. 8 illustrates a swap-detect system 800 in accordance with one embodiment.

The swap-detect system 700 can operate with this same register file logic, but in the implementation showing in FIG. 8 (swap-detect system 800), requires just a data/ECC mask 802 for the register file 302. The swap-detect system 700 or swap-detect system 800 needs only the ability to write one or the other of the data or ECC to the register file per instruction. One notable advantage of the swap-detect system 700 or swap-detect system 800 is that they need not duplicate MOV instructions if the datapath moves both the data and the check-bits in an end-to-end fashion back to the register file 302. This is a worthwhile optimization in many systems.

The swap-detect system 700 or swap-detect system 800 may be implemented for example by adding an intra-thread duplication pass and associated scheduling logic to the back-end code compiler for the system, providing a kernel launch parameter to enable/disable the swap-code logic, adding error correction logic to the system runtime logic (optional), implementing a 1 bit ECC or data register destination switch in the ISA, and (for swap-detect system 800) providing a data/ECC mask, and for optimization implementing an end-to-end MOV instruction in the data path.

The swap-detect system 700 and/or the swap-detect system 800 provide a natural organization to leverage specialized ECC prediction units in the datapath to serve as low-cost check bit generators for the most common operations. The ECC prediction system 900 illustrated in FIG. 9-FIG. 11 requires no new error checkers, or new signals to conventional error reporting sub-systems, unlike most concurrent checking architectures. The register file error detection logic 704 is leveraged to provide error detection as for the swap-code system 300, swap-detect system 700, and/or swap-detect system 800.

Figure 9:
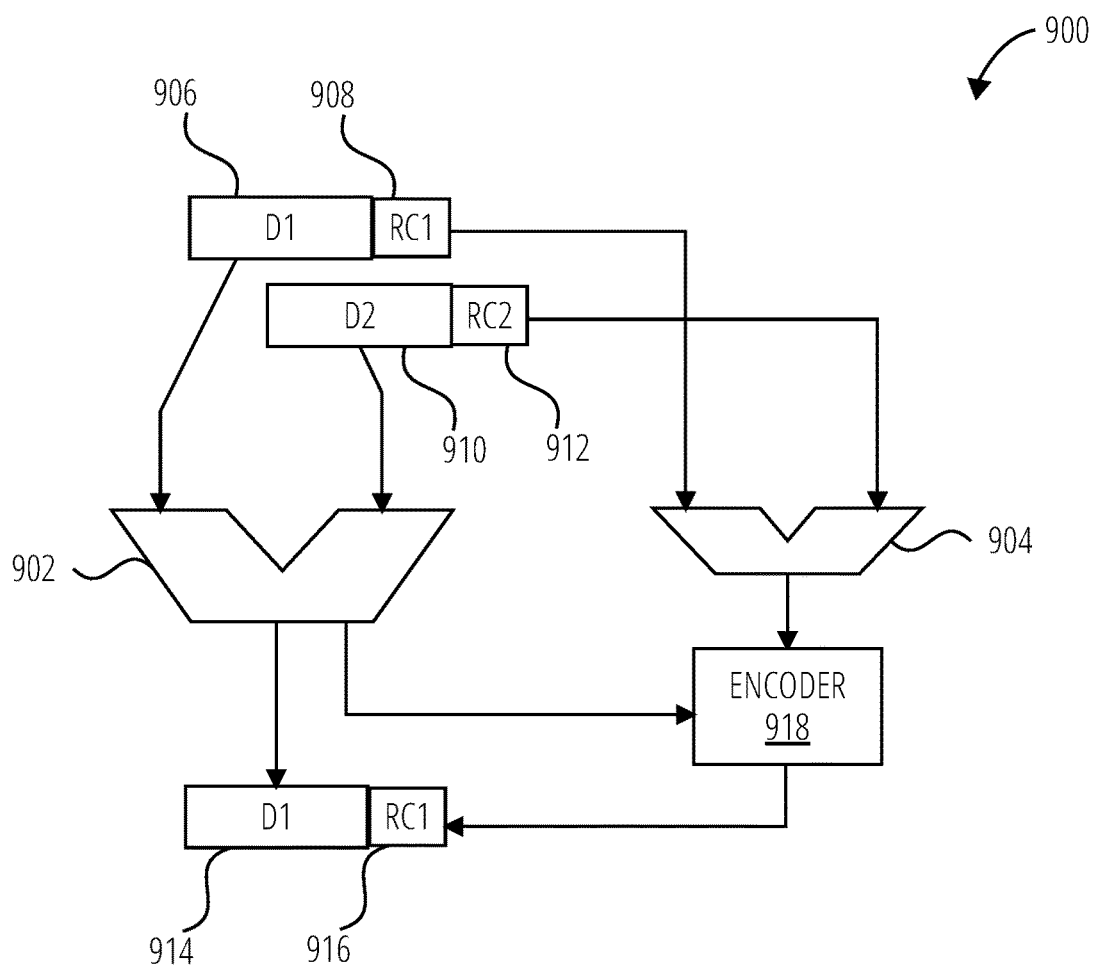
FIG. 9 illustrates an ECC prediction system 900 in accordance with one embodiment.

Residue codes are well suited for check-bit prediction, because they are closed under (modular) arithmetic such that they can be added and multiplied directly. FIG. 9 illustrates the organization of an error detecting and correcting system using a reduced-width residue arithmetic unit alongside the regular datapath.

Such an ECC prediction system 900 in one embodiment comprises a data ALU 902, a residue code ALU 904, and an encoder 918 that operates on two codewords, one having a data part D1 906 and a code part RC1 908, and the other having a data part D2 910 and a code part RC2 912. The output of the ECC prediction system 900 is a codeword having a data part D1 914 and a code part RC1 916.

Figure 10:
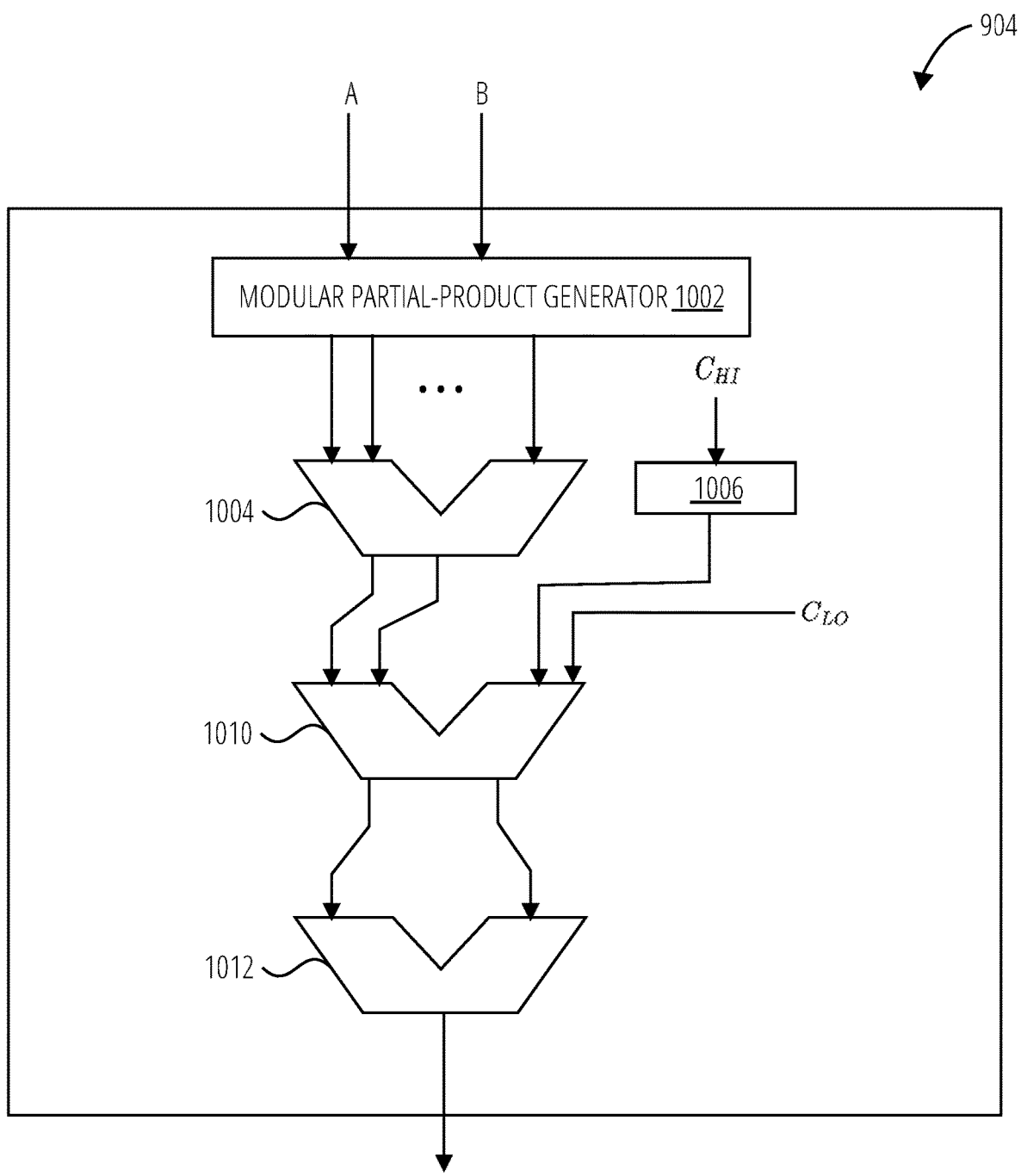
FIG. 10 illustrates a residue code ALU 904 comprising a modular multiply-add unit with addend correction, in accordance with one embodiment.
Figure 11:
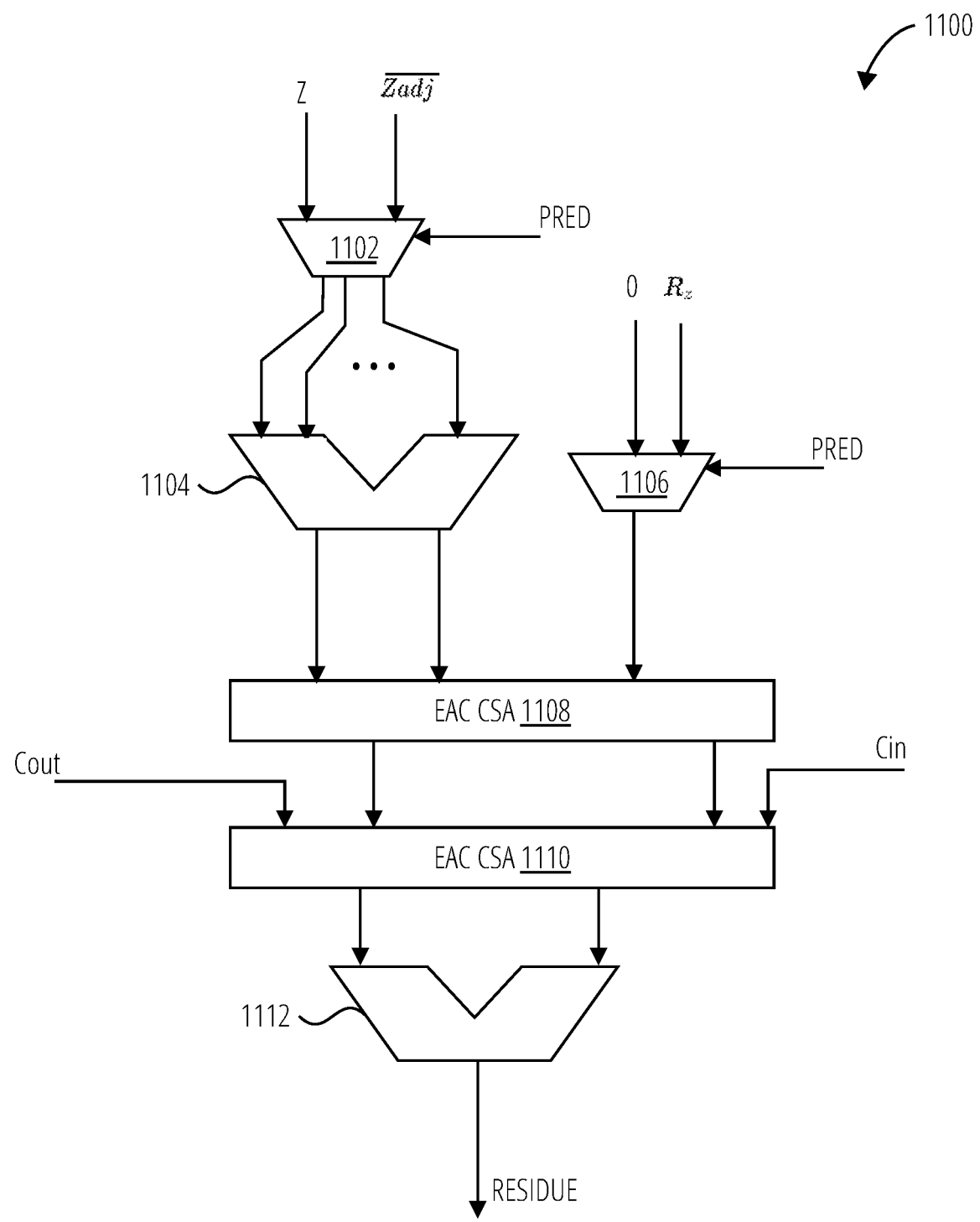
FIG. 11 illustrates an encoder 1100 in accordance with one embodiment.

The data ALU 902 is a conventional arithmetic logic unit, whereas the residue code ALU 904 and encoder 918 have new features not found in conventional ECC predictive systems. Details of the residue code ALU 904 in one embodiment are illustrated in FIG. 10, and details on the encoder 918 in one embodiment are illustrated in FIG. 11.

A system may therefore be implemented that incorporates selective ECC prediction units in the datapath to opportunistically check selected operations, while relying on software duplication and a swap-detect system 700 or swap-detect system 800 as a fallback for the vast majority of rarely-used instructions. The ECC prediction logic may re-use the register file error codes for error detection and protect register storage in an end-to-end fashion. This protects the full GPU instruction set rather than restricting protection to a small set of supported operations and without introducing the hardware complexity and cost of a fully-concurrently-checked datapath. The residue code ALU 904 and encoder 1100 logic also provide residue arithmetic algorithms to deal with a 32 bit datapath and mixed-operand-width multiply-add.

Further innovations to implement such a system for use with residue codes are described below, including (1) use of residue codes for the fixed-point multiply-add operation, (2) adapting the residue arithmetic circuitry to deal with 64 bit inputs split into two 32 bit registers, and (3) adapting the residue encoder to deal with 64 bit outputs from the datapath, allowing it to write back valid 32 bit codewords to the register file.

Restricting the implementation to low-cost residue codes with a modulus that is one less than a power-of-two makes it so that residue arithmetic units (and encoders/decoders) can be crafted from a few simple building blocks. A carry-save multi-operand modular adder (CS-MOMA) adds up many inputs, internally propagating each carry-out as the carry-in to the next computation (and outputting the result in the redundant carry-save format). A logarithmic delay CS-MOMA tree can be efficiently realized using a reduction tree of constant-delay end-around-carry carry-save adders (EAC CSAs). An end-around-carry carry-propagate adder (EAC adder) adds up two numbers, incrementing the end result if there is a carry-out. An EAC adder can be crafted using a parallel prefix adder with an additional level to internally re-propagate the carry-out signal.

Referring to FIG. 10, given these residue arithmetic building blocks, the residue code may be computed for an N-bit product or sum using the low-cost modulus $$A = 2^a - 1; a \in N$$

and adding up $$\frac{N}{a}$$

non-overlapping bit-slices in a CS-MOMA 1010 and an EAC adder 1012. Residue addition can be performed directly with the a-bit EAC adder 1012. Residue multiplication uses a modified partial product generation algorithm (e.g., modular partial-product generator 1002), an a-wide, a-deep CS-MOMA 1004, a CS-MOMA 1010, and the a-bit EAC adder 1012. Low-cost residue arithmetic generally uses a one's complement representation to store and compute residues, meaning that there are two values of zero (somewhat similar to sign-magnitude numbers). In this case the all 0 and all 1 words represent positive and negative zero. The result is a modular multiply-add unit with addend correction.

A GPU processor executes a complex instruction set with many instruction variants, including some specialized graphics instructions that are occasionally re-purposed for compute workloads. One advantage of using swap-detect with an ECC prediction system 900 that separates it from prior approaches to concurrent checking is that ECC check-bit prediction need only be used for operations that are efficient to predict with little design effort. All other instructions fall back on intra-thread duplication and swap-detect for checking.

There are several coding challenges when applying residue arithmetic to accelerate the operation of error detecting and correcting systems in a GPU processor. Disclosed herein are innovations required to enhance residue arithmetic for use in a GPU pipeline. Residue arithmetic works when the residue codes are known for the full inputs, resulting in generation of the residue of the full output.

A challenge in many systems is that the register file stores EDC codes at a 32 bit granularity, while instructions can combine registers for the sometimes-wider-than-32 bit datapath. This problem may be addressed by generating the proper residue code for any 64 bit inputs from the constituent 32 bit parts as follows. The operations of multiplication and addition can be efficiently merged into a multiply-add (MAD) unit by feeding the addend into the multi-operand adder (e.g., CS-MOMA 1010) that is at the heart of the residue code ALU 904. GPU processors make good use of MAD operations and conventional systems do not utilize a residue arithmetic MAD unit.

Residue coding complications arise from having sometimes-wider-than-32 bit inputs. A 32 bit MAD unit multiplies two 32 bit operands and adds a 64 bit addend to them. Instead of having an input residue for the full 64 bit addend $$|C|_A$$

the input is two residues for the two 32 bit halves as $$|C_{HI}|_A$$

and $$|C_{LOW}|_A$$

Herein, $$|x|_A$$

denotes the residue of x modulo A. In this case the proper full residue may be derived from the two residues from:

$$|C|_A = |C_{HI}|_A \otimes |2^{32}|_A \otimes |C_{LOW}|_A \qquad \text{Equation 1}$$

where the operators are low-cost residue multiplication and addition (left to right).

Fortunately, $$|2^{32}|_A$$

is a perfect power-of-two for many low-cost residues, making this computation very low cost, generally. Low-cost moduli that might typically be used include 3, 7, 15, 31, 63, 127, and 255. Corresponding correction factors are 1, 4, 1, 4, 4, 16, and 1. Thus, no correction is needed for the full residue when A is 3, 15, or 255, and the correction (modular multiplication by affixed power-of-two) can be implemented with wiring or other low-cost logic 1006 for the other moduli.

A second challenge for residue arithmetic in GPU processors is from greater-than-32 bit instruction outputs, including instructions with carry-out signals or instructions that produce a 64 bit product or sum. Residue arithmetic produces the residue of the full output, and it does not split this residue into the constituent 32 bit words that are written back to the register file. This issue is addressed by modifying the residue encoder as shown in FIG. 11.

Referring to FIG. 11, an embodiment of a modified encoder 1100 comprises a selector switch 1102 for inputs to a CS-MOMA 1104, a selector switch 1106 for inputs to an EAC CSA 1108, an EAC CSA 1110, and an EAC adder 1112.

Constructed as such, the encoder 1100 now serves a dual purpose. The EAC CSA 1108 encodes for instructions without check-bit prediction, as before. However, for instructions with check-bit prediction, the EAC CSA 1108 re-encodes the output of the residue code ALU 904 to properly represent the 32 bit codewords that are written back to the register file.

During regular operation, (e.g., PRED=0), the encoder 1100 in FIG. 11 calculates the residue of the pipeline output (Z) as normal. For instructions with check-bit prediction (PRED=1), the encoder 1100 calculates and subtracts the residue of $Z_{adj}$ from the residue ($R_z$) produced by the reduced-width residue arithmetic pipeline. Here, $$\overline{Z_{adj}}$$

is the one's complement/bitwise inverse of Zadj. For operations with 64 bit outputs, Zadj should be set to the half of the residue code ALU 904 output that is not being written back at a given time. This adjustment ensures that the proper 32 bit codewords are written to the register file.

There is a second level of residue code adjustment to support carry-out and carry-in bits. Due to the one's complement encoding of the residues, a proper adjustment can be calculated by adding in a single residue whose bottom bit is set to the carry-in and with every other bit set to the carry-out signal. The resultant adjustments are given in Table 2.

TABLE 2

| Cout | Cin | Signal | Adjustment |
|---|---|---|---|
| 0 | 0 | 000 . . . 0 | +0 |
| 0 | 1 | 000 . . . 1 | +1 |
| 1 | 0 | 111 . . . 0 | −1 |
| 1 | 1 | 111 . . . 1 | −0 |

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

What is claimed is:

1. A method comprising:

executing an original instruction;

executing a duplicate instruction of the original instruction;

generating a data portion DI resulting from execution of the original instruction; generating an error correcting code portion ECC I for the data portion DI of the original instruction;

generating an error correcting code portion ECC2 for a data portion D2 of the duplicate instruction; and executing logic to write-back to a register file, and to associate with one another, the data portion DI resulting from execution of the original instruction, and the error correcting code portion ECC2 for the data portion D2 resulting from execution of the duplicate instruction.

2. The method of claim 1, further comprising:

executing error detection on a codeword D1/ECC2 each time DI is read from the register file.

3. The method of claim 1, further comprising:

executing an instruction set architecture instruction to apply a mask to select either a data portion or an error correcting code portion of a codeword for write-back to the register file.

4. The method of claim 1, further comprising:

executing logic to write-back to the register file and to associate with one another the data portion D2 resulting from execution of the duplicate instruction and the error correcting code portion ECC I for the data portion DI resulting from the execution of the original instruction.

5. The method of claim 4, further comprising:

executing an instruction set architecture instruction to selectively write-back to the register file either a data portion of a codeword or an error correcting code portion of the codeword.

6. The method of claim 4, further comprising:

providing in the register file a first register set for data portions of codewords; and providing in the register file a second register set separately addressable from the first register set for error correcting code portions of the codewords.

7. The method of claim 4, further comprising generating error codes at least as indicated in the following table:

| D1/E1 | D2/E2 | D2/E1 | Error Type | Likely Cause |
|---|---|---|---|---|
| 0 | 0 | 1 | DUE | Compute Error |
| 0 | 1 | 0 | DCE (D1/E1) | Storage Error in E2 |
| 1 | 0 | 0 | DCE (D1/E2) | Storage Error in D1. |

8. The method of claim 4, further comprising generating error codes at least as indicated in the following table:

| D1/E1 | D2/E2 | D2/E1 | Error Type | Likely Cause |
|---|---|---|---|---|
| 0 | 0 | 0 | DUE | Unknown/Invalid |
| 0 | 0 | 1 | DUE | Compute Error |
| 0 | 1 | 0 | DCE (D1/E1) | Storage Error in E2 |
| 0 | 1 | 1 | DCE (D1/E1) | Double Event in D2/E2 |
| 1 | 0 | 0 | DCE (D1/E2) | Storage Error in D1 |
| 1 | 0 | 1 | DCE (D2/E2) | Double Event in D1/E1 |
| 1 | 1 | 0 | DUE | Multibit Error in D1/E2 |
| 1 | 1 | 1 | DUE | Multibit Error in D1/D2 or E1/E2. |

9. The method of claim 1, further comprising:

predicting one or both of ECC I or ECC2 for 64 bit operands for the original instruction or duplicate instruction by merging a plurality of 32 bit residue codes for the operands into a 64 bit residue code prior to prediction of ECC1 or ECC2.

10. The method of claim 9, further comprising:

re-encoding any greater than 32 residue codes into a plurality of codewords each 32 bits long for write-back to the register file.

11. A processor, comprising:

logic to execute an original instruction and to execute a duplicate instruction of the original instruction;

logic to generate a data portion DI resulting from execution of the original instruction;

logic to generate an error correcting code portion ECC I for the data portion DI of the original instruction;

logic to generate an error correcting code portion ECC2 for a data portion D2 of the duplicate instruction; and logic to write-back to a register file and to associate with one another the data portion DI resulting from execution of the original instruction and the error correcting code portion ECC2 for the data portion D2 resulting from execution of the duplicate instruction.

12. The processor of claim 11, wherein the processor further comprises:

logic to execute error detection on a codeword D1/ECC2 each time DI is read from the register file.

13. The processor of claim 11, wherein the processor further comprises:

logic to execute an instruction to apply a mask to select either a data portion of a codeword or an error correcting code portion of the codeword for write-back to the register file.

14. The processor of claim 11, wherein the processor further comprises:

logic to write-back to the register file and to associate with one another the data portion D2 resulting from execution of the duplicate instruction and the error correcting code portion ECC I for the data portion DI resulting from execution of the original instruction.

15. The processor of claim 14, wherein the processor further comprises:

logic to execute an instruction to selectively write-back to the register file either a data portion of a codeword or an error correcting code portion of the codeword.

16. The processor of claim 14, wherein the processor further comprises:

a first register set for data portions of codewords; and a second register set separately addressable from the first register set for error correcting code portions of the codewords.

17. The processor of claim 14, wherein the processor further comprises logic to generate error codes at least as indicated in the following table:

| D1/E1 | D2/E2 | D2/E1 | Error Type | Likely Cause |
|---|---|---|---|---|
| 0 | 0 | 1 | DUE | Compute Error |
| 0 | 1 | 0 | DCE (D1/E1) | Storage Error in E2 |
| 1 | 0 | 0 | DCE (D1/E2) | Storage Error in D1. |

18. The processor of claim 14, wherein the processor further comprises logic to generate error codes as indicated in the following table:

| D1/E1 | D2/E2 | D2/E1 | Error Type | Likely Cause |
|---|---|---|---|---|
| 0 | 0 | 0 | DUE | Unknown/Invalid |
| 0 | 0 | 1 | DUE | Compute Error |
| 0 | 1 | 0 | DCE (D1/E1) | Storage Error in E2 |
| 0 | 1 | 1 | DCE (D1/E1) | Double Event in D2/E2 |
| 1 | 0 | 0 | DCE (D1/E2) | Storage Error in D1 |
| 1 | 0 | 1 | DCE (D2/E2) | Double Event in D1/E1 |
| 1 | 1 | 0 | DUE | Multibit Error in D1/E2 |

-continued

| D1/E1 | D2/E2 | D2/E1 | Error Type | Likely Cause |
|---|---|---|---|---|
| 1 | 1 | 1 | DUE | Multibit Error in D1/D2 or E1/E2. |

19. The processor of claim 11, wherein the processor further comprises:

logic to predict one or both of ECC1 or ECC2 for 64 bit operands for the original instruction or duplicate instruction by merging a plurality of 32 bit residue codes for the operands into a 64 bit residue code prior to prediction of ECC1 or ECC2.

20. The processor of claim 19, wherein the processor further comprises:

logic to re-encode any greater than 32 residue codes into a plurality of codewords each 32 bits long for writeback to the register file.

\* \* \* \* \*

UNITED STATES PATENT AND TRADEMARK OFFICE
CERTIFICATE OF CORRECTION

PATENT NO. : 10,621,022 B2
APPLICATION NO. : 15/845314
DATED : April 14, 2020
INVENTOR(S) : Michael Sullivan et al.

Page 1 of 1

It is certified that error appears in the above-identified patent and that said Letters Patent is hereby corrected as shown below:

In the Specification

Column 1 Line 4 insert:
--This invention was made with Government support under Contract No. DE-AC52-07NA27344 and Lawrence Livermore National Laboratory Subcontract No. B620719, awarded by the Federal Department of Energy. The Government has certain rights in this invention.--

Signed and Sealed this
Sixteenth Day of June, 2020

Andrei Iancu
*Director of the United States Patent and Trademark Office*